May 17, 1927.

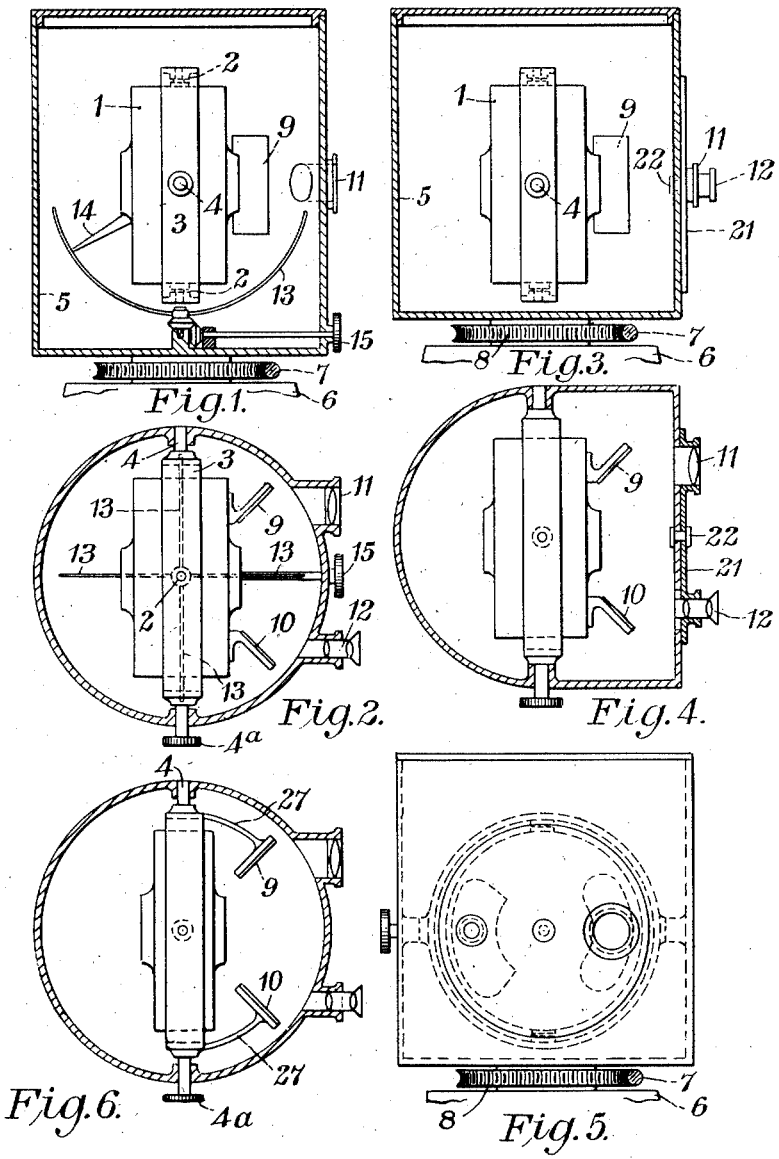

J. B. HENDERSON 1,628,777

TELESCOPIC APPARATUS

Original Filed July 26, 1919  3 Sheets-Sheet 2

May 17, 1927.

J. B. HENDERSON

TELESCOPIC APPARATUS

Original Filed July 26, 1919  3 Sheets-Sheet 3

1,628,777

Inventor
James B Henderson
By his Attorney
Henry Moakley

Patented May 17, 1927.

1,628,777

UNITED STATES PATENT OFFICE.

JAMES BLACKLOCK HENDERSON, OF LEE, ENGLAND.

TELESCOPIC APPARATUS.

Original application filed July 26, 1919, Serial No. 313,533, and in Great Britain March 8, 1915. Divided and this application filed May 19, 1920. Serial No. 382,678.

(GRANTED UNDER THE PROVISIONS OF THE ACT OF MARCH 3, 1921, 41 STAT. L., 1313.)

This invention relates to optical instruments adapted for use on angularly moving platforms as on board ship or on aircraft and the like.

The invention has for its primary object the provision of an optical instrument of this character in which the field of view will be stabilized irrespective of the angular motion of the platform upon which it rests.

The invention has also for its object the provision of means for stabilizing the field of view by gyroscopic apparatus and for compensating for any straying of the gyro, by adjusting a part of the optical system or by adjusting the gyro or by making both these adjustments if desired.

The invention will be clear from the following description when taken into conjunction with the accompanying drawings, and will be particularly pointed out in the appended claims. The present application is a division of my co-pending application for a sighting device, filed July 26, 1919, Serial No. 313,533.

In the accompanying drawings which illustrate my invention Figs. 1 and 2 show respectively elevation and plan of one arrangement of the parts of the sight or optical instrument.

Figs. 3, 4, and 5 show side elevation, plan and front elevation of an alternative arrangement which embodies a method of optical compensation for the tilting of the gyro axis.

Fig. 6 shows plan of an alternative arrangement of fixing the reflectors.

Figure 7:
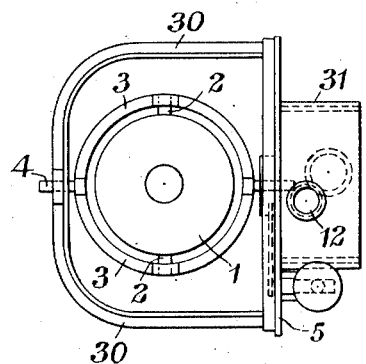
Figs. 7, 8, 9 and 10 show respectively front elevation, side elevation with the gyro removed, sectional plan and side elevation of the telescope of an arrangement which permits the observer to face the target and which has optical compensation for the tilting of the gyro axis.
Figure 8:
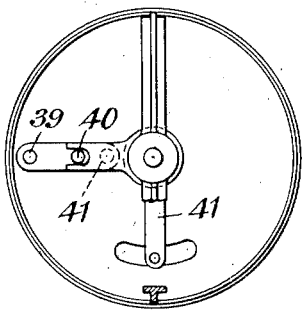

Figs. 11, 12, 13, 14, and 15 show various arrangements of optical systems which I may employ.

The gyro-rotor casing 1 is suspended on a vertical trunnion axis 2 in the gimbal ring 3, which is suspended on the horizontal trunnion axis 4 in the outer casing 5 of the instrument. I preferably arrange the gyro to be in neutral equilibrium on the trunnion axis 2 but may give a small gravitational stability to the combination of gyro 1 and gimbal ring 3 about the trunnion axis 4.

The outer casing 5 may be supported on any suitable mounting on a ship or other angularly moving platform but for purposes of illustration it is shown mounted on a vertical axis on the pedestal 6 with a worm 7 gearing in a worm wheel 8 for training the casing in azimuth. The rotor casing 1 carries the two reflectors 9 and 10, the planes of reflection of which are at right angles, are normally vertical and intersect in the axis of the trunnion 2. The objective 11 and eyepiece 12 are fixed to the case symmetrically about the centre line of the gyro in its central position, and the focal plane and the optical centre of the objective are arranged so that they are equidistant from the trunnion axis 4.

The observer sits with his back to the target with his eye to the eyepiece 12 and as the ship rolls or pitches the observer and the outer case 5 move with the ship. The explanation of the steadiness of the image is that when the objective 11 rises and falls the image of the target formed by the objective in the focal plane rises and falls an equal amount, but the image and cross wires on the focal plane also rise and fall by the same amount as the objective since they and the objective are equidistant from the axis 4. Hence angular motion about axis 4 does not affect the position of the image on the cross wires.

Any angular motion of the casing 5 about the rotor axis in its central position causes the objective to rise and the eyepiece to fall (or vice versa) by equal amounts but it simultaneously inclines the line of intersection of the two mirrors 9 and 10 and the result is that the image of the target remains on the cross wire but becomes slightly inclined to the vertical. Any straying motion of the gyro about the vertical trunnion does not affect the position of the image on the cross wire but straying motion about the horizontal trunnion raises or lowers the image of the target on the cross wire. The gravitational stability about the horizontal trunnion axis 4 is intended to prevent the straying from exceeding a small value. When the gyro strays about the vertical trunnion axis 2 it can be brought back to the central position by means of a torque applied to the end of the trunnion axis 4 which projects through the case 5 and may be furnished with a friction head 4ª for that purpose. When it strays about the horizontal axis it can be brought back by means of impacts imparted to the rotor casing by turning the four pronged sprocket 13 by means of the knob 15, causing the spokes of the sprocket to engage with the light spring 14 which is attached to the rotor casing. These impulses may be applied to the rotor casing by any other suitable means, electrical or mechanical.

If the rotor axis deviates in azimuth from the central position the image of the target moves up and down by a small amount relatively to the cross wire with each roll and if the greatest accuracy of sighting is required, an alternating precession would have to be introduced to compensate for this motion. This compensation is more accurately done optically as shown in Figs. 3, 4 and 5. The optical compensation consists in mounting the objective 11 and eyepiece 12 on a plate which is pivoted on a pin 22 of the outer casing 5. The same compensation applies to any tilting of the gyro axis about the trunnion 4 and obviates the necessity of introducing a means of precessing the gyro about the horizontal trunnion.

If the gyro axis becomes tilted out of the horizontal plane by rotation about the trunnion 4, the image of the target is raised, let us say, on the cross wires. The superposition of the image again on the cross wires can be brought about by a corresponding lowering of the objective or a raising of the eyepiece or a combination of both. This compensation is brought about by turning the plate 21 on the pin 22.

Fig. 6 shows an alternative method of mounting the mirrors on the gimbal ring instead of on the gyro case, the mirrors 9 and 10 being attached to the gimbal ring 3 by the two arms 27. Instead of being fixed to the gimbal ring they might equally well be carried on the horizontal trunnion 4, the objective and eyepiece being suitably arranged to correspond.

An objectionable feature of the constructions hereinbefore described is that the observer has his back towards the target. Figs. 7, 8, 9 and 10 illustrate respectively side elevation, back elevation, sectional plan and front elevation of an arrangement of parts which overcomes this objection and which has certain other advantages.

The rotor casing 1 is carried on the vertical trunnion 2 in the gimbal ring 3 which is supported on the horizontal trunnion 4, at one end of the case 5 and at the other end on the U shaped bracket 30. The outer case 5 is mounted upon a pedestal as in Fig. 1 or on any other convenient type of mounting. The objective 11 and eyepiece 12 of the telescope are rigidly attached to the cylindrical sleeve 31 which can turn on the cylindrical projection 32 of the casing 5, suitable apertures being cut in the cylinder 32 to clear the beam of the telescope. The optical centre of the objective and the focal plane are equidistant from the centre of the cylinder but on opposite sides of the centre.

The telescope is of the ordinary type containing four reflectors as in prismatic binoculars. All four reflectors may be attached to the trunnion axis 4 but in the arrangement illustrated only two 33 and 34 (Fig. 9) are attached to the trunnion axis 4 by the crank arm 37, the line of intersection of the two planes of reflection being perpendicular to the trunnion axis. The other two reflectors 35 and 36 (Figs. 9 and 10) are carried by the cranked arm 38 which is pivotally attached to the casing 5 by the pin 39. The line of intersection of the planes of reflection of 35 and 36 is normally coaxial with the trunnion 4. The motion of the cranked arm 38 about the pin 39 is controlled by a pin 40 attached to the arm engaging in a slot in the L shaped lever 41 (Fig. 8) which turns on a boss 42 on the casing 5 concentric with the trunnion 4. The vertical arm of the L shaped lever is actuated by the screw 43 working in the nut 43ª, which is attached to the casing 5, pressing against the pin 44 which projects from the L shaped lever through a slotted hole in the casing 5. By turning the screw 43 the cranked arm 38 can be raised or lowered about the pin 39 and the two reflectors 35 and 36 are thus raised or lowered.

The image of the target can be elevated or depressed in the field of view by turning the screw 43. The image remains stationary on the cross wires so long as the gyro does not precess about the horizontal trunnion 4. When the ship rolls so much that the beam from the target after passing through the objective misses the reflectors altogether so that the field of view is dark, the image of the target can easily be brought into the field again by turning the cylindrical sleeve 31 carrying the objective and eyepiece on the cylindrical projection 32 of the casing 5, in opposite phase to the roll so as to keep the line joining the objective and eyepiece roughly horizontal. A quick motion once during each roll is equally effective.

Figures 9, 10:
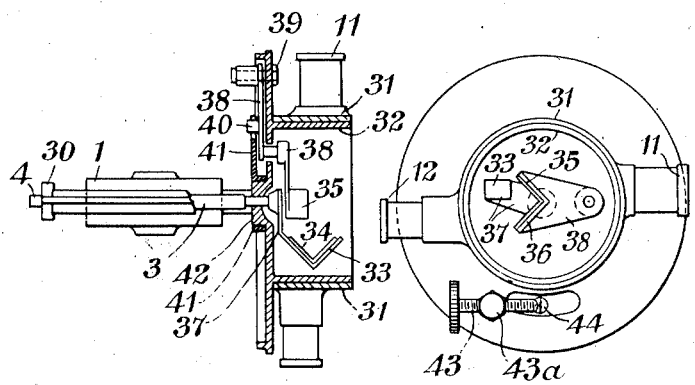
Figure 11:
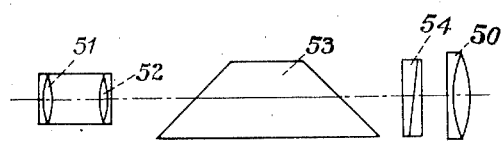
Figure 12:
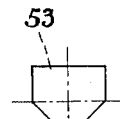

The optical system illustrated in Figs. 2, 6 and 9 are not the only ones I may use. In general, I may use any telescopic system which gives an upright image, the inverting portion of the system being stabilized by the gyro and the various dimensions of the system being chosen so that the image remains stationary on the cross-wires. For example, I may employ a system like that illustrated in Figs. 11 and 12. The objective 50 and the eyepiece lenses 51 and 52 are attached to the telescope ring as in Fig. 9. The prism 53, a side elevation of which is illustrated in Fig. 12, is stabilized by the gyro. The travelling achromatic prism 54 serves to keep the object on the cross-wires when the gyro-axis tilts, the translation of the prism 54 parallel to the axis of the telescope being linked up to the screw 43 (Fig. 10) by suitable mechanical linkage.

Figure 13:
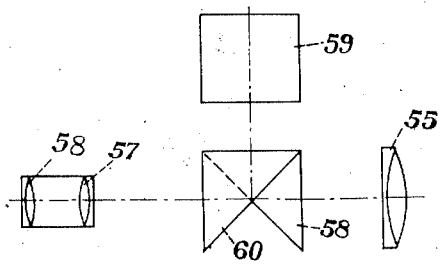
Figure 14:
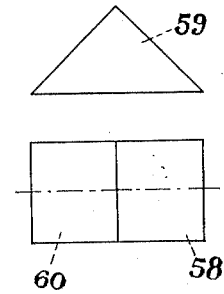

Figs. 13 and 14 show two elevations of another arrangement I may employ. The objective 55, the eyepiece 56—57 and the right-angled prisms 58—59 move with the ship, while the right-angled prism 60 is stabilized by the gyro. In order to compensate for the tilting of the gyro-axis I may translate the prisms 58 and 59 and link this translation with the screw 43 by suitable linkage.

Figure 15:
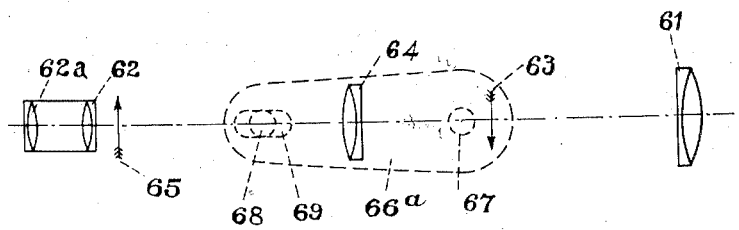

Fig. 15 shows an arrangement I may employ which contains no prisms or reflecting surfaces. The objective 61 and the eyepiece 62—62ª move with the ship. The focal plane of 61 is at 63 and the inverting lens or system of lenses 64, which is stabilized by the gyro, forms an upright image in the second focal plane 65. In order to compensate for the tilting of the gyro-axis, I may attach the lens 64 to a crank 66 which normally turns about a crank-pin 67 co-axial with the gyro-trunnion and attached to the case 5 of the instrument. This crank is stabilized by the gyro by means of a pin 68 carried by an equal crank 66ª mounted on the gyro trunnion 4 which is coaxial with the crank pin 67, the crank pin 68 engaging in a slot 69 in the crank 66. The pin 67 is attached to the lever 38 in Fig. 9 so that it can be moved up and down by hand. This arrangement of levers might be applied to the prism 53 in Fig. 11 to move up and down and thus to obviate the necessity of using the prism 54.

I claim:

1. An optical instrument adapted for use on an angularly moving platform comprising a casing adapted to move with the platform, an optical system having optical elements arranged to nullify the effect thereon of the movement of the platform, a gyroscope having a horizontal axis of rotation, and means connecting a part of said optical system to said gyroscope whereby the said part may be stabilized.

2. An instrument adapted for use on an angularly moving platform comprising an optical system, a gyroscope for stabilizing a part of said system, and means for adjusting the gyroscope to compensate for its straying.

3. An instrument for use on an angularly moving platform comprising optical elements adapted to partake of the angular movement of the platform, a gyroscope, an optical element connected to the gyroscope and movable relatively to the platform by the gyroscope to compensate for the effect of the angular movement of the platform on the field of view of the instrument and means for compensating for straying of the gyroscope.

4. An optical instrument adapted for use on an angularly moving platform comprising a casing adapted to move with the platform, an optical system carried by the casing and including an inverting part, and gyroscopic apparatus controlling the inverting part of the system to stabilize the field of view.

5. An optical instrument adapted for use on an angularly moving platform comprising a casing adapted to move with the platform, an optical system having an inverting part, a gyroscope having a horizontal trunnion axis, and means connecting the inverting part of the optical system to the horizontal trunnion axis whereby the said part may be stabilized.

6. An optical system comprising a plurality of parts, one of which is optically reversing, and a gyroscope controlling the optical reversing part of the system.

7. In an apparatus of the type described, an observation instrument mounted on a body subject to angular variations of position, an optical reversing member in optical relation to the observation instrument, stabilizing means free from forced oscillations in phase with the disturbing forces introduced by the oscillations of the body, and means for connecting said member and the stabilizing means whereby relative motion between the stabilizing means and the body is communicated to the member.

8. In an apparatus of the type described, an observation instrument mounted on a body subject to angular variations of position, an optical system in said instrument containing an optical reversing portion, means free from forced oscillations in phase with the disturbing forces introduced by the oscillations of the body for stabilizing said portion in the plane of reversal, and means for connecting said portion with the stabilizing means whereby relative motion between the stabilizing means and the body is communicated to said portion.

9. An optical instrument for use on an angularly moving body, comprising optical elements adapted to partake of the angular movement of the body, an optical element mounted to move relatively to the body, a gyroscope mounted for movement about mutually perpendicular axes, connections between the gyroscope and the optical element for moving the latter relatively to the body to compensate for the effect of the angular movement thereof on the field of view of the instrument and means for compensating for the straying of the gyroscope about its axes.

10. An optical instrument for use on an angularly moving body, comprising optical elements adapted to partake of the angular movement of the body, an optical element mounted to move relatively to the body, a gyroscope mounted for movement about mutually perpendicular axes, connections between the gyroscope and the optical element for moving the latter relatively to the body to compensate for the effect of the angular movement thereof on the field of view of the instrument and means for applying torques to the gyroscope about each of its supporting axes to compensate for straying about the other axis.

11. An optical instrument for use on an angularly moving body, comprising a casing adapted to partake of the angular movement of the body, optical elements adjustably mounted on the casing, an optical element associated with the casing and mounted to move relatively thereto, a gyroscope mounted for movement about mutually perpendicular axes, connections between the gyroscope and the optical element for moving the element relatively to the casing to compensate for the effect of the angular movement of the body on the field of view of the instrument and means for compensating for the straying of the gyroscope about its axes.

12. An optical instrument for use on an angularly moving body, comprising a casing adapted to partake of the angular movement of the body, and provided with a projection, a member movably mounted on the projection and carrying some of the optical parts of the instrument, an optical element movably mounted with respect to the casing, a gyroscope, means for mounting the gyroscope on the casing for movement about mutually perpendicular axes, connections between the optical element and the mounting means for moving the element relatively to the casing to compensate for the effect of the angular movement of the body on the field of view of the instrument, a second optical element movably mounted on the casing and means for adjusting the position of the second optical element with respect to the casing.

JAMES BLACKLOCK HENDERSON.